F. W. DROSTEN.
PAPER CUTTER.
No. 11,041. Reissued Nov. 19, 1889.
Fig. I.
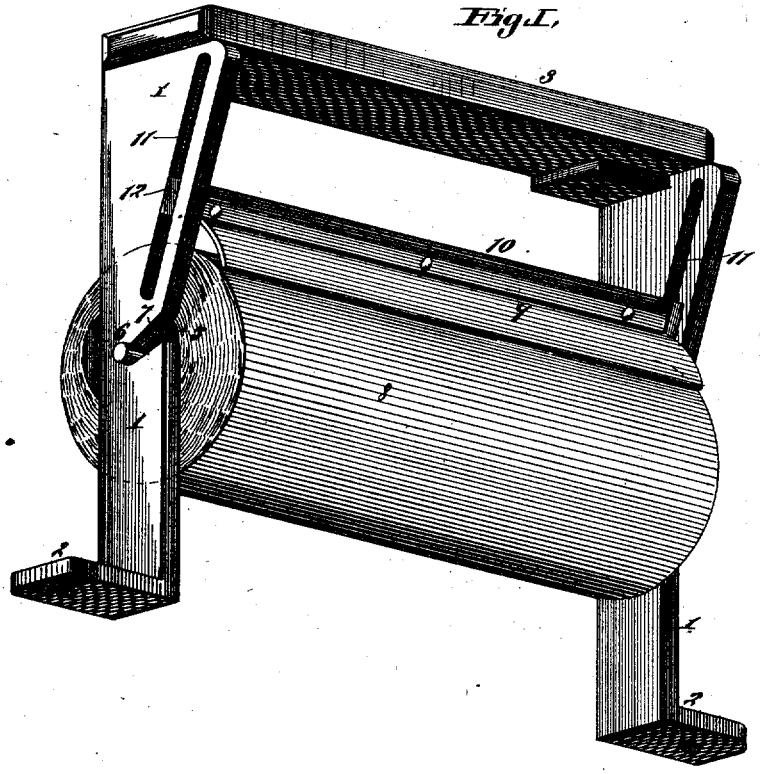
Fig. II.
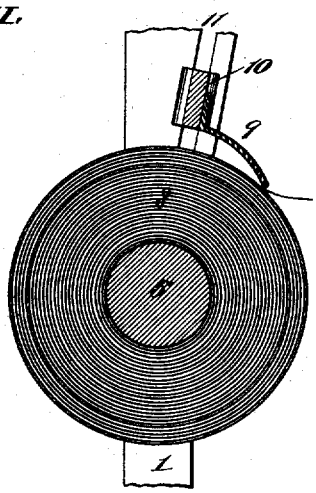
Attest:
Charles Pickles.
E. Arthur.
Inventor:
Frederick W. Drosten
By Wright Bro
Atty's
N. PETERS, Photo-Lithographer, Washington, D. C.

UNITED STATES PATENT OFFICE.

FREDERICK W. DROSTEN, OF ST. LOUIS, MISSOURI.

PAPER-CUTTER.

SPECIFICATION forming part of Reissued Letters Patent No. 11,041, dated November 19, 1889.

Original No. 365,334, dated June 21, 1887. Application for reissue filed May 20, 1889. Serial No. 311,476.

*To all whom it may concern:*

Be it known that I, FREDERICK W. DROSTEN, of the city of St. Louis, in the State of Missouri, have invented a certain new and useful Improvement in Paper-Cutters, of which the following is a full, clear, and exact description, reference being had to the accompanying drawings, forming part of this specification, and in which—

Figure I represents a perspective view of my improved paper-cutter; and Fig. II is a transverse section through the roll and knife, showing part of the frame in elevation.

My invention relates to an improved paper cutter for store use and the like; and my invention consists in features of novelty hereinafter fully described, and pointed out in the claim.

Referring to the drawings, 1 represents the frame, provided with feet 2, by which it may be secured to any suitable support, and which has a cross-piece 3 at top.

5 represents a roller provided with gudgeons 6, fitting in slots or notches 7 of the frame, and upon this roll is wound the paper 8, which is removed as required for use.

9 represents a knife secured to a sliding head or plate 10, held and working in slots 11 of the frame, and provided with projections 12, by which it is kept from end movement in the frame. The knife projects downwardly and forwardly from the head 10, as shown in the drawings. The slots 11 are inclined, so that while the knife and cross-head are allowed to feed down automatically they will not be lifted by the strain of the paper upon the knife, for the reason that the slots 11 are inclined, causing the cross-head to twist or bind in the slots when pressure is brought on the cutting-edge of the knife, thereby producing so much friction that the knife will not be raised by the pressure of the paper upon it as the latter is being cut off. When a piece of paper is wanted, the end is pulled out, as shown in Fig. II, and then cut off by drawing it against the edge of the knife. When it is desired to remove the roller to substitute it by another, the cross-head and knife are raised until the roller can be removed from the slots 7, as will be plainly understood.

I claim as my invention—

In a paper-cutter, the combination, with the roller, of a vertical frame having notches for the journals of said roller and inclined slots, and a knife resting on said roller and guided by said inclined slots, whereby the gravitation of the knife is permitted, while its opposite motion is resisted, substantially as set forth.

FREDERICK W. DROSTEN.

In presence of—

GEO. H. KNIGHT,

EDW. S. KNIGHT.